Figure 1:
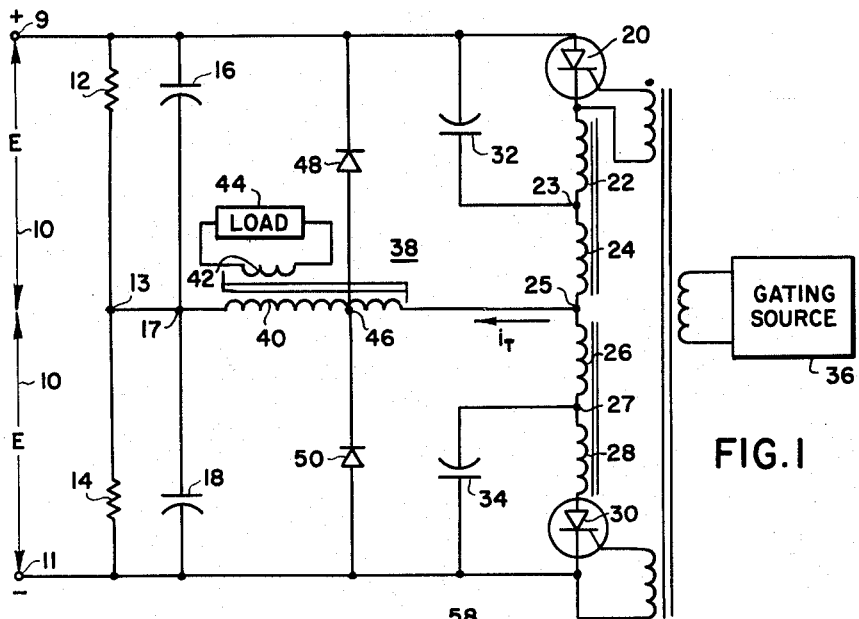

July 26, 1966

L. H. WALKER 3,263,152

STATIC INVERTER

Filed Aug. 21, 1962

*INVENTOR.*
LOREN H. WALKER

BY Isidore Match

ATTORNEY

United States Patent Office 3,263,152
Patented July 26, 1966

3,263,152
STATIC INVERTER
Loren H. Walker, Waynesboro, Va., assignor to General
Electric Company, a corporation of New York
Filed Aug. 21, 1962, Ser. No. 218,276
13 Claims. (Cl. 321—45)

This invention relates to inverters. More particularly, it relates to an improved static inverter employing gate controlled rectifiers as the switching elements therein.

In known static inverters of the parallel type, i.e., wherein a pair of gate controlled rectifiers are connected in parallel and both of these rectifiers are in circuit with the primary winding of an output transformer, a commutating capacitor is generally provided across the switching devices. During the operation of the inverter, the capacitor is charged during each half cycle in respective alternating polarities. At the end of a half cycle, the nonconducting gate controlled rectifier is rendered conductive causing the charged capacitor to reverse bias the presently conducting gate controlled rectifier while the current is transferred to the nonconducting gate controlled rectifier.

In the aforesaid parallel type of inverter, to avoid the difficulties presented thereby such as the required large size of the commutating capacitor, the fact that operating characteristics change greatly with load, the need for a very large capacitor to produce sufficient reverse biasing time when there is an inductive load present, the variation of output voltage over a very wide range with load variations, and the inability of the inverter to operate with no load since it must be started on load, so-called "pumpback" diodes are provided between the output transformer and the unidirectional potential source to enable energy to be fed back from reactive loads to the potential source. The use of these pumpback diodes considerably reduces the effect of load power factor on the commutation parameters in the circuit and also permits the commutating capacitor to charge quickly and resonantly at the beginning of the half cycle and to return the excess energy of the resonant charge to the load and the source.

At present, a very widespread application of static inverters is to change the D.C. power provided by a battery source to alternating current power. The voltage of a battery under load cannot be readily regulated and varies with the state of the charge of the battery. In this present day, new direct current power sources which are being developed, such as thermionic, magneto-hydrodynamic and junction-type devices also do not readily lend themselves to voltage and voltage transient regulation.

To effect such regulation, many phase control arrangements have been evolved. In such phase control arrangements wherein gate controlled rectifiers have been utilized as the power switching devices, twice the number of silicon controlled rectifiers have had to be used, viz., one pair of gate controlled rectifiers for power inversion and one pair of gate controlled rectifiers for phase control. In nearly all gate controlled rectifier inverters, the "turn-off," i.e., the rendering nonconductive of the conducting power switching gate controlled rectifier is accomplished by the "turning-on," i.e., the rendering conductive of the other power switching gate controlled rectifier. With such arrangements, no phase control can be exercised in the power switching silicon controlled rectifiers since one or the other of the switching pair of gate controlled rectifiers must always be "on," i.e., conducting. In other words, in presently known static inverters, the two power switching gate controlled rectifiers respectively effect "turn-off" in each other. The additional gate controlled rectifiers in the phase control arrangement may or may not require turn-off depending upon the particular circuit.

It is, accordingly, an important object of this invention to provide a static inverter in which gate controlled rectifiers are utilized as the power switching elements therein and wherein output voltage regulation is effected without requiring further gate controlled rectifiers in the circuit for phase control or commutation, and without the need for external sensing, reference voltages, or feedback loops.

It is a further object to provide a static inverter in accordance with the preceding object wherein pumpback diodes are included to enable the power inversion with lagging power factor loads.

It is another object to provide a static inverter in accordance with the preceding objects wherein a saturable output transformer is utilized and wherein the rendering nonconductive of the conducting gate controlled rectifier is accomplished by the saturation of such output transformer, and, thereafter, the rendering conductive of the other and nonconductive gate controlled rectifier is effected by frequency determining gating pulses.

It is still another object to provide a static inverter in accordance with the preceding objects wherein self-regulation is provided by the sharp saturation characteristics of the aforesaid output transformer.

Generally speaking and in accordance with the invention, there is provided an arrangement for converting the power from a direct current potential source to an alternating current power output comprising first and second gate controlled rectifiers in circuit with the source, a saturable transformer comprising a primary winding in circuit with the source and a secondary winding for applying the output of the circuit to a load, a series combination of a first pair of like inductors having a mutual unity coupling connected between the primary winding and the first pair of gate controlled rectifiers, a series combination of a second pair of like inductors having a mutual unity coupling connected between the primary winding and the second gate controlled rectifier, a first commutating capacitor connected in circuit with the source and the junction of the first inductors and a second capacitor connected in circuit with the source and the junction of the second inductors.

The features of this invention which are believed to be new are set forth with particularity in the appended claims. The invention itself, however, may best be understood by reference to the following description when taken in conjunction with the accompanying drawings which show illustrative embodiments of static inverters in accordance with the invention.

Figure 2:
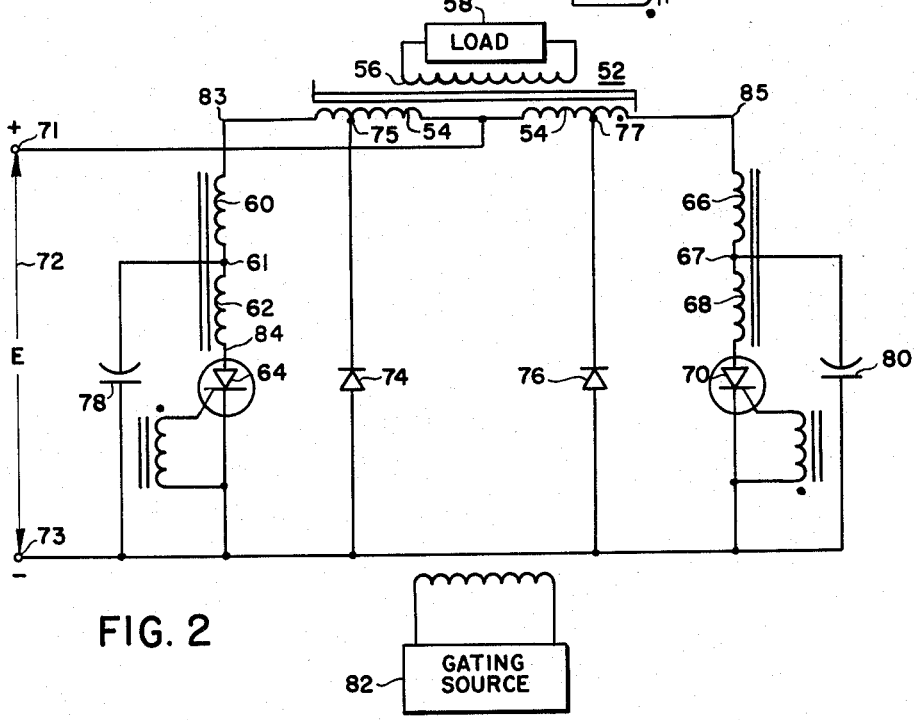

In the drawings, FIG. 1 is a schematic diagram of a first embodiment of a circuit in accordance with the principles of the invention; and FIG. 2 is a schematic depiction of a second embodiment of the invention.

Referring now to FIG. 1, the inverter depicted therein converts to A.C. power, the D.C. output produced from unidirectional potential source 10. Source 10 is suitably center-tapped and the respective series arrangements of like resistors 12 and 14 and like capacitors 16 and 18 connected across source 10 with their respective junctions 13 and 17 connected to each is an example of how a center-tapped output from source 10 can be provided although any other suitable arrangement may be utilized. Since capacitors 16 and 18, of necessity, have to be quite large where source 10 has a relatively high voltage, they may be suitably of the electrolytic type.

Connected across source 10 is the series arrangement of the anode to cathode path of a silicon controlled rectifier 20, like inductors 22, 24, 26 and 28; and the anode to cathode path of a silicon controlled rectifier 30. Respective pairs of inductors 22 and 24, and 26 and 28, each have a unity mutual coupling. A capacitor 32 is connected between the positive terminal 9 of source 10 and the junction 23 of inductors 22 and 24 and a capacitor 34 is connected between the junction 27 of inductors 26 and 28 and the negative terminal 11 of source 10. A gating source 36 which may suitably be a multivibrator or a unijunction transistor relaxation oscillator provides gate pulses to the gate electrodes of silicon controlled rectifiers 20 and 30.

The primary winding 40 of a saturable output transformer 38 is connected between junction 17 and the junction 25 of inductors 24 and 26 and the load 44 is connected across the transformer secondary winding 42. Transformer 38 suitably has a core consisting of a rectangular hysteresis loop magnetic material which endows it with sharp saturating characteristics and is chosen to provide a given after-saturation inductance. In circuit between an intermediate point 46 of primary winding 40, not necessarily its midpoint, and positive terminal 9 is the anode to cathode path of a "pumpback" diode 48 and connected between negative terminal 11 and intermediate point 46 is the anode to cathode path of a pumpback diode 50, diodes 48 and 50 serving to return power to source from the commutating capacitors 16 and 18 or when load 44 includes a lagging power factor reactive component.

In the ensuing description of the operation of the circuit of FIG. 1, the terms "positive half cycle" and "negative half cycle" are utilized. By positive half cycle, it is intended to convey the entire period between the initiation of current in the "positive" silicon controlled rectifier and the initiation of current in the "negative" silicon controlled rectifier and, by "negative half cycle," there is meant the entire period between the initiation of current in the "negative" silicon controlled rectifier and the initiation of current in the "positive" silicon controlled rectifier. By "positive" and "negative" silicon controlled rectifiers, there are meant the respective silicon controlled rectifiers during whose respective periods of conductivity, the positive and negative half cycles of outputs of the circuit are produced.

It is, of course, realized that, within the above definitions, the output voltage may be negative for a good portion of the positive half cycle and that the output voltage may be positive for a good portion of the negative half cycle. However, the convenience of these definitions will become apparent as the description proceeds. Also, in the description of the operation, the voltage referred to is measured with respect to the center-tapped power source, i.e., junction 17 in FIG. 1.

In considering the operation of the circuit of FIG. 1, let it be assumed that it is at the time immediately preceding the beginning of the positive half cycle whereby the voltage at junction 25 measured with respect to junction 17 is positive. At this time, capacitors 32 and 34 are supplying a positive current to load 44.

When the signal from gating source 36 is applied to the gate electrode of silicon controlled rectifier 20, the silicon controlled rectifier 20 is rendered conductive. This causes the voltage at junction 25 to rise to the input voltage, E, after the occurrence of a transient which charges capacitor 34 to the value of the supply voltage and discharges capacitor 32 to zero charge. The signal from gating source 36 which is preferably a pulse of relatively short duration returns to zero early in the cycle and silicon controlled rectifier 20 continues to conduct. A steady state is reached in which the load current is being supplied by silicon controlled rectifier 20 through inductors 22 and 24.

After a given time interval, the core of transformer 38 saturates, such time interval, of course, depending upon the volt-second characteristics of the core of transformer 38. With transformer 38 in the saturated condition, its after-saturation inductance causes it to appear as a very small inductor whereby the current $i_T$ flowing through primary winding 40 increases very rapidly. Such rapid change in current is supplied from source 10 through capacitor 32 and inductor 24. The build-up of current moving in the downward direction through inductor 24 causes a corresponding build-up of current moving in the upward direction in inductor 22 because of the mutual unity coupling between inductors 22 and 24. When this upward moving component of current in inductor 22 attains the magnitude of the downward moving load current flowing through inductor 24, then the current through silicon controlled rectifier 20 falls to zero and, consequently, silicon controlled rectifier 20 is rendered nonconducting. This latter series of events occurs quite rapidly. As soon as silicon controlled rectifier 20 ceases to conduct, inductor 22 is effectively open circuited whereby it acts as an uncoupled inductor. The voltage between junction 23 and junction 17 must then be divided by the inductance of inductor 24 and the after-saturation inductance of winding 40 instantaneously.

Because of the presence of capacitor 32, the voltage at junction 23 cannot change instantaneously. Thus, the voltage at junction 25, the value of which had remained very close to the supply voltage, E, suddenly drops in accordance with the equation:

$$e = E \frac{2L_T}{L_{24} + 2L_T}$$

wherein $L_T$ is the after-saturation inductance of winding 40, $L_{24}$ is the inductance of inductor 24 and $e$ is the instantaneous voltage at junction 25. This causes a voltage to appear across inductor 24 which is reflected as a voltage of opposite polarity across inductor 22. Since the voltage at junction 23 is still quite near the supply voltage value, the voltage at the cathode of silicon controlled rectifier 20 suddenly rises to a value which is higher than the supply voltage, and thereby reverse biases silicon controlled rectifier 20. The current, $i_T$, is now supplied by capacitors 32 and 3 through inductors 24 and 26. Such current builds up to a maximum as the voltage at junction 25 swings from a value of $+E$ to a value of $-E$ resonantly. The current, $i_T$, goes through a positive half cycle of oscillation, but when it starts to reverse, transformer 38 resumes its unsaturated condition and the current $i_T$ can go negative only by the amount of the excitation current of the transformer and the current that the load will accept. Thus, capacitors 32 and 34 are left charged so that junction 25 is at a negative potential of almost $-E$ and are discharging negative current into load 44. This is the condition that the capacitors 32 and 34 remain in until silicon controlled rectifier 30 is gated into conductivity by the output of gating source 36 at the beginning of the negative half cycle. It can now be appreciated why the particular definitions of positive and negative half cycles have been selected in this description, i.e., capacitors 32 and 34 being positively charged to less than the supply voltage, and discharging into the load. Of course, if the saturation period of transformer 38 is short, or load 44 is a heavy one, capacitors 32 and 34 may become completely discharged before the start of the next half cycle.

In FIG. 2, there is shown an inverter constructed in accordance with the principles of the invention wherein the primary winding 54 of a saturable transformer 52 is connected between the series arrangements respectively of like inductors 60 and 62 and the anode to cathode path of a silicon controlled rectifier 64 and like inductors 66 and 68, and the anode to cathode path of a silicon controlled rectifier 70. The midpoint of primary winding 54 is connected to the positive terminal 71 of the D.C. source 72 and the cathodes of silicon controlled rectifiers 64 and 70 are connected to the negative terminal 73 of source 72. The load 58 is connected across secondary winding 56 of transformer 52 and the anode to cathode paths of pumpback diodes 74 and 76 are disposed between negative terminal 73 and respective points 75 and 77 near the opposite terminals of primary winding 54. A first commutating capacitor 78 is connected between the junction 61 of inductors 60 and 62 and negative terminal 73 and a second commutating capacitor 80 is connected between the junction 67 of inductors 66 and 68 and negative terminal 73. Silicon controlled rectifiers 64 and 70 are gated into conductivity by the pulses produced from gating source 82 which may be a multivibrator, unijunction transistor relaxation oscillator or like signal generator.

The operation of the inverter of FIG. 2 is substantially similar to that of the inverter of FIG. 1 except, of course, that the inverter of FIG. 2 is of the parallel type. Thus, if it is assumed that silicon controlled rectifier 64 has just been gated into conductivity by a half cycle of output from gating source 82, twice the source voltage appears across primary winding 54 due to autotransformer action with the dot end terminal thereof being positive. Current now flows through inductors 60 and 62 and silicon controlled rectifier 64 to negative terminal 73. The gate signal returns to zero early in the cycle leaving silicon controlled rectifier 64 conducting and a steady state is reached in which the load current is being supplied by silicon controlled rectifier 64 through inductors 60 and 62.

After a given time interval depending upon the characteristics of the core of transformer 52, viz., flux density, core area and winding turns, transformer 52 saturates whereby the current therethrough increases very rapidly. This rapidly increasing current flows through inductor 60 and capacitor 78. The buildup of downward moving current in inductor 60 causes the buildup of upward moving current in inductor 62. When this upward component of current in inductor 62 reaches the magnitude of the load current which had been flowing in the downward direction in inductor 60, then the current through silicon controlled rectifier 64 falls to zero and it becomes nonconducting. This occurs rapidly. As soon as conduction ceases in silicon controlled rectifier 64, inductor 62 is open circuited causing inductor 60 to act as an uncoupled inductor.

With inductor 60 appearing as an uncoupled inductor, the voltage between the supply terminal 71 and junction 61 must be instantaneously divided across inductor 60 and $L_T$, the after-saturation inductance of primary winding 54. Thus the voltage at junction 83 jumps from a potential near to that of the value of negative side of the source 72 to a positive voltage. Capacitor 78 prevents the voltage at junction 61 from changing instantaneously. Thus the positive voltage applied to junction 83 appears across inductor 60 and is reflected across inductor 62 as a negative voltage at point 84. This lowers junction 84 below the potential of junction 73, reverse biasing the gate controlled rectifier 64.

Capacitor 80 was charged to twice the supply voltage during the conduction of gate controlled rectifier 64. After gate controlled rectifier 64 is reverse biased, capacitor 80 discharged resonantly through inductor 66, winding 54 and inductor 60 into capacitor 78. The voltage at junction 85 drops resonantly from nearly twice the source votlage toward nearly zero while, by auto-transformer action, the voltage at 83 rises from nearly zero to nearly twice the value of the source voltage. During this voltage change, a sinusoidal pulse of current flows in winding 54, right to left on the diagram, i.e., from the dot to the non-dot terminal. When the potential at point 85 approaches that of the negative side of source 73, this current in winding 54 attempts to reverse. Transformer 52 resumes its unsaturated condition, and the current reverses only by the amount of the load current.

Thus the circuit is left, after silicon controlled rectifier 64 is rendered nonconductive with capacitor 78 charged to nearly twice the source voltage, discharging through load 58 into capacitor 80.

From the foregoing, it is accordingly seen that with the static inverters of this invention, the power switching silicon controlled rectifiers, viz., the only gate controlled rectifiers in the circuit do not effect turn-off in each other. Such turn-off is accomplished by the independent action of the output transformer. Since it is not necessary to render one silicon controlled rectifier conductive to render the other silicon controlled rectifier nonconductive, accordingly, there exists a time during each half cycle when neither silicon controlled rectifier is conducting and thus phase control can be exercised on these power switching, i.e., inverting silicon controlled rectifiers.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. Apparatus for converting a unidirectional power source to an alternating current power source comprising, input means for applying a unidirectional potential to said apparatus, saturable transformer means comprising primary and secondary windings, a first switching circuit for enabling current to flow through said primary winding in one direction, said first switching circuit comprising a first series combination of a first pair of substantially like inductors and a first switching element, said first inductor pair in series arrangement forming a junction therebetween and having mutual unity coupling therebetween, a second switching circuit for enabling current to flow through said primary winding in a direction opposite to said one direction, said second switching circuit comprising a second series combination of a second pair of substantially like inductors and a second switching element, said second inductor pair in series arrangement forming a junction therebetween and having mutual unity coupling therebetween, a first capacitor connected between said junction of said first inductor pair and said input means, a second capacitor connected between said junction of said second inductor pair and said input means, and switching means for controlling said switching elements, said switching means including gating means for alternately rendering said switching elements conductive and said saturable transformer means operative to alternately render said switching elements non-conductive.

2. Apparatus for converting a unidirectional power source to an alternating current power source comprising, input means for applying a unidirectional potential to said apparatus, said input means including a pair of input terminals, a saturable transformer comprising primary and secondary windings, a first switching circuit for enabling current to flow through said primary winding in one direction, said first switching circuit comprising a first series combination of a first pair of substantially like inductors and a first switching element, said first inductor pair in series arrangement forming a junction therebetween and having mutual unity coupling therebetween, said first switching element being connected at one end to one of said input terminals and connected at the other end to one end of said first inductor pair, a second switching circuit for enabling current to flow through said primary winding in a direction opposite to said one direction, said second switching circuit comprising a second series combination of a second pair of substantially like inductors and a second switching element, said second inductor pair in series arrangement forming a junction therebetween and having mutual unity coupling therebetween, said second switching element being connected at one end to the other of said input terminals, and connected at the other end to one end of said second inductor pair, said first and second inductor pairs in series arrangement forming a junction therebetween, said primary winding being connected between the junction of said first and second inductor pairs and said input means, a first capacitor connected between said junction of said first inductor pair and one of said input terminals, a second capacitor connected between said junction of said inductor pair and the other of said input terminals, and switching means for alternately rendering conductive said switching elements to alternately connect said primary winding in series with each of said first and second series combinations thereby providing an alternating current flow in said primary winding to thereby produce an alternating current output voltage across said secondary winding.

3. Apparatus as in claim 2 wherein the duration of conductivity of said switching elements is determined by the saturation characteristic of said saturable transformer.

4. Apparatus as in claim 2 and further including a load across said secondary winding, feedback means for enabling energy to be fed back from said load to said unidirectional power source.

5. Apparatus as in claim 2 wherein said switching elements are gate controlled rectifiers.

6. Apparatus as in claim 2 and further including a load across said secondary winding and feedback means for enabling energy to be fed back from said load to said unidirectional power source, said feedback means comprising first and second diodes connected between an intermediate point on said primary winding and said input terminals respectively.

7. Apparatus for converting a unidirectional center tapped power source to an alternating current power source comprising, input means for applying a unidirectional potential to said apparatus, said input means including positive, negative, and center input terminals, first and second gate controlled rectifiers with the anode of said first gate controlled rectifier connected to said positive input terminal and the cathode of said second gate controlled rectifier connected to said negative input terminal, a first pair of substantially like inductors having a mutual unity coupling connected in series forming a junction therebetween, said first pair of inductors connected at one end thereof to the cathode of said first gate controlled rectifier, a second pair of substantially like inductors having a mutual unity coupling connected in series forming a junction therebetween, said second pair of inductors connected at one end thereof to the anode of said second gate controlled rectifier, said first and second pairs of inductors in series arrangement forming a junction therebetween, a saturable transformer comprising primary and secondary windings, said primary winding being connected at one end to said junction of said inductor pairs and connected at the other end to said center input terminal, a first capacitor connected between said junction of said first inductor pair and said positive input terminal, a second capacitor connected between said junction of said second inductor pair and said negative input terminal, switching means for alternately rendering conductive said gate controlled rectifiers to alternately connect said primary winding in series with each of said series combinations, the duration of conductivity of said gate controlled rectifiers being determined by the saturation characteristic of said saturable transformer, said secondary winding having a load connected thereacross, and energy feedback means for enabling energy to be fed back from said load to said unidirectional power source comprising first and second diodes connected between an intermediate point on said primary winding and said positive and negative input terminals respectively.

8. An inverter for converting a unidirectional power source to an alternating current power source comprising, a pair of input terminals, a saturable transformer comprising primary and secondary windings, a first switching circuit for enabling current to flow through said primary winding in one direction, said first switching circuit comprising a first series combination of a first pair of substantially like inductors and a first switching element, said first inductor pair in series arrangement forming a junction therebetween and having mutual unity coupling therebetween, said first switching element being connected at one end to one of said input terminals and at the other end to one end of said first inductor pair, a second switching circuit for enabling current to flow through said primary winding in a direction opposite to said one direction, said second switching circuit comprising a second series combination of a second pair of substantially like inductors and a second switching element, said second inductor pair in series arrangement forming a junction therebetween and having mutual unity coupling therebetween, said second switching element being connected at one end to said one input terminal and connected at the other end to one end of said second inductor pair, a first capacitor connected between said junction of said first inductor pair and said one input terminal, a second capacitor connected between said junction of said second inductor pair and said one input terminal, said primary winding interconnecting said first and second series combinations, the other of said input terminals being connected to an intermediate point on said primary winding, said intermediate point defining first and second portions of said primary, and switching means for alternately rendering conductive said switching elements to alternately connect said first primary portion in series with said first series combination and said input terminals and to connect said second primary portion in series with said second series combination and said input terminals.

9. Apparatus as in claim 8 wherein the duration of conductivity of said switching elements is determined by the saturation characteristic of said saturable transformer.

10. Apparatus as in claim 8 and further including a load across said secondary winding and feedback means for enabling energy to be fed back from said load to said unidirectional power source.

11. Apparatus as in claim 8 wherein said switching elements are gate controlled rectifiers.

12. Apparatus as in claim 10 wherein said feedback means comprises a first diode connected between an intermediate point on said first primary portion and said one input terminal and a second diode connected between an intermediate point on said second primary portion and said one input terminal.

13. An inverter for converting a unidirectional power source to an alternating current power source comprising, a pair of input terminals, a first series combination of a first pair of substantially like inductors and a first gate controlled rectifier, said first inductor pair in series arrangement forming a junction therebetween and having mutual unity coupling therebetween and said first gate controlled rectifier having its anode to cathode electrical path interconnecting one end of said first inductor pair to one of said input terminals, a second series combination of a second pair of substantially like inductors and a second gate controlled rectifier, said second inductor pair in series arrangement forming a junction therebetween and having mutual unity coupling therebetween and said second gate controlled rectifier having its anode to cathode electrical path interconnecting one end of said second inductor pair to said one input terminal, said gate controlled rectifiers being in back-to-back arrangement, a first capacitor connected between said junction of said first inductor pair and said one input terminal, a second capacitor connected between said junction of said second inductor pair and said one input terminal, a saturable transformer having a primary winding connected between the other end of said first inductor pair and the other end of said second inductor pair and a secondary winding for applying the output of said inverter to a load, the other of said input terminals being connected to an intermediate point on said primary winding, said intermediate point defining first and second portions of said primary, switching means for alternately rendering conductive said gate controlled rectifiers to alternately connect said first primary portion in series with said first series combination and said input terminals and to connect said second primary portion in series with said second series combination and said input terminals, the duration of conductivity of said gate controlled rectifiers being determined by the saturation characteristic of said saturable transformer, and energy feedback means comprising a first diode connected between an intermediate point on said first primary portion and said one input terminal and a second diode connected between an intermediate point on said second primary portion and said one input terminal.

References Cited by the Examiner
UNITED STATES PATENTS

| | | | |
|---|---|---|---|
| 3,010,062 | 11/1961 | Van Emden | 323—22 |
| 3,089,965 | 5/1963 | Krezek | 307—88.5 |
| 3,120,633 | 2/1964 | Genuit | 321—45 |

JOHN F. COUCH, *Primary Examiner.*

LLYOD McCOLLUM, *Examiner.*

J. M. THOMSON, M. WACHTELL,
*Assistant Examiners.*